United States Patent [19]

Redmer et al.

[11] 4,413,912
[45] Nov. 8, 1983

[54] APPARATUS FOR THE PRODUCTION OF A REACTION MIXTURE

[75] Inventors: Frank Redmer, Leverkusen; Kurt Krippl, Monheim, both of Fed. Rep. of Germany

[73] Assignee: Bayer Aktiengesellschaft, Leverkusen, Fed. Rep. of Germany

[21] Appl. No.: 373,587

[22] Filed: Apr. 30, 1982

[30] Foreign Application Priority Data

May 16, 1981 [DE] Fed. Rep. of Germany ....... 3119662

[51] Int. Cl.³ .............................................. B29B 1/06
[52] U.S. Cl. .................................... 366/69; 425/557; 425/558; 366/349
[58] Field of Search .................... 366/69, 77, 98, 189, 366/184, 349; 222/342, 96; 264/172; 425/205, 557, 558

[56] References Cited

U.S. PATENT DOCUMENTS

| | | | |
|---|---|---|---|
| 2,972,774 | 2/1961 | MacLeod | 366/77 X |
| 3,895,085 | 7/1975 | Suzuki et al. | 264/172 X |
| 3,975,128 | 8/1976 | Schlüter | 425/207 |
| 4,175,874 | 11/1979 | Schneider | 366/182 |

*Primary Examiner*—Harvey C. Hornsby
*Assistant Examiner*—Thomas W. Epting
*Attorney, Agent, or Firm*—Gene Harsh; Joseph C. Gil; Richard A. Elder

[57] ABSTRACT

The present invention relates to an apparatus for the production of a solid-forming or a foam-forming reaction mixture from at least two flowable components, the apparatus comprising a mixing head, at the outlet opening of which is connected at an angle a filling tube in which an ejection piston which is designed as a piston head and having a piston rod of a smaller diameter is positioned, the rear neutral position of the piston head being located upstream of the outlet opening of the mixing chamber, characterized in that an introduction slit is provided in the filling tube between the rear neutral position of the piston head of the ejection piston and the outlet opening of the mixing chamber and a delivery device for cleaning platelets is associated with the introduction slit.

8 Claims, 4 Drawing Figures

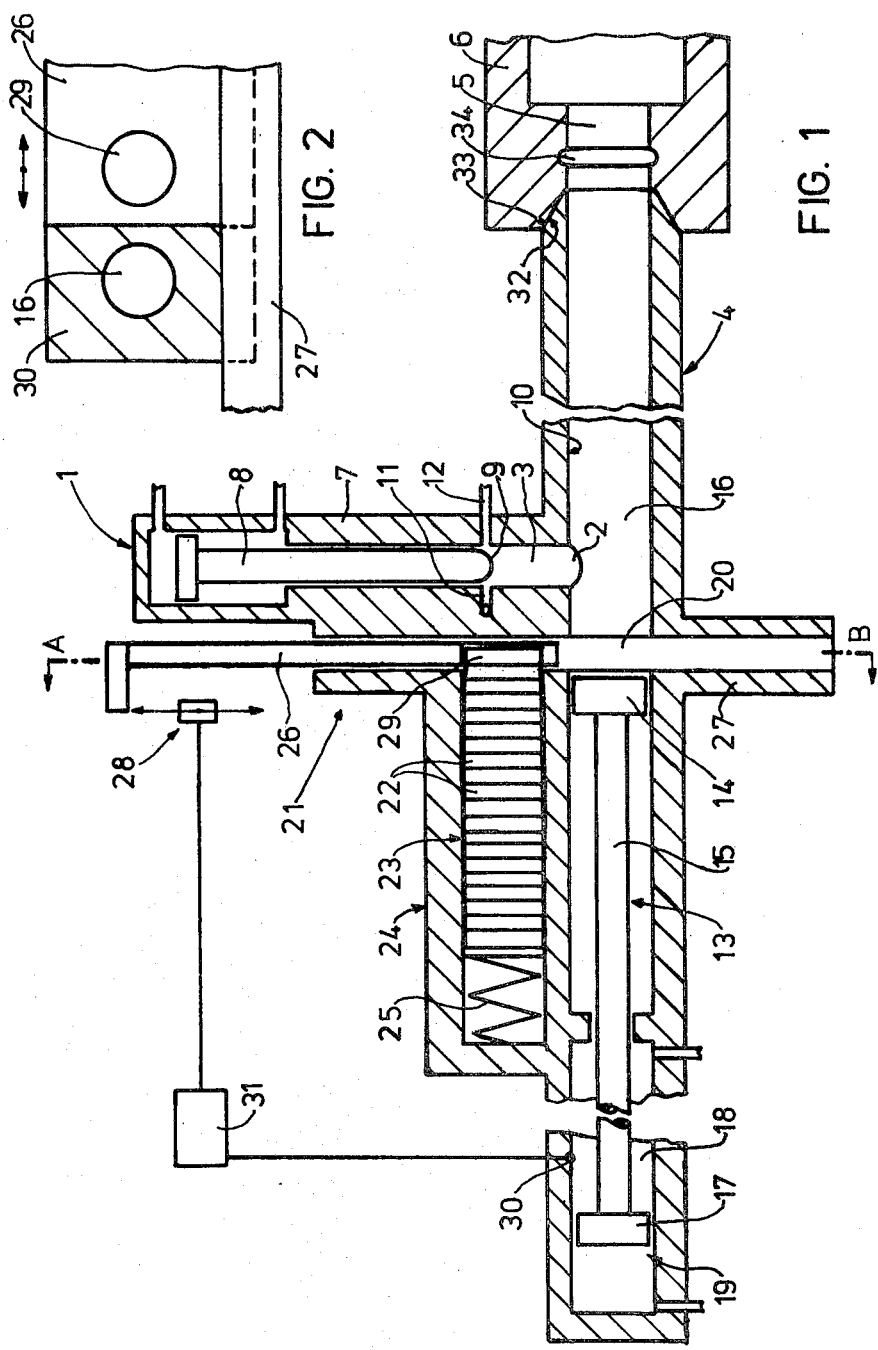

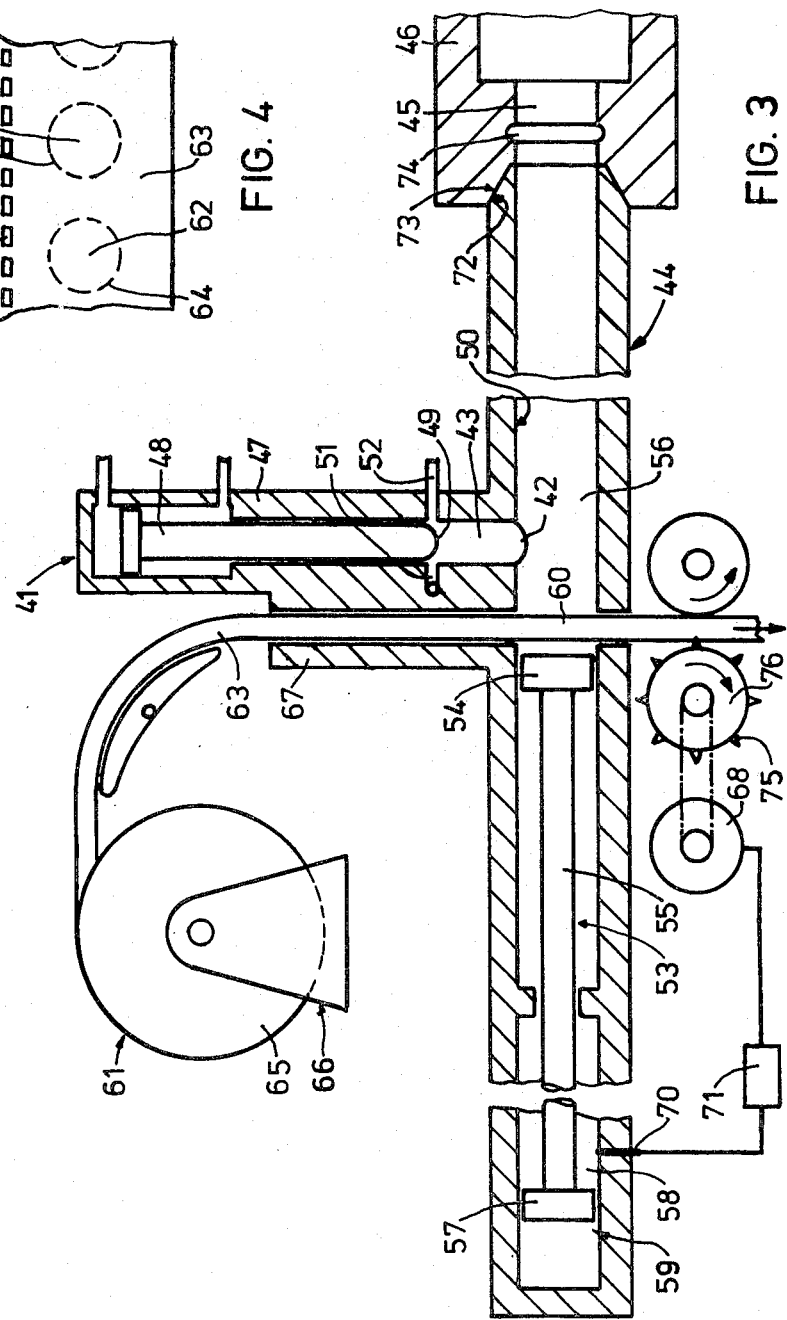

APPARATUS FOR THE PRODUCTION OF A REACTION MIXTURE

The present invention is directed to an apparatus for the production of a solid-forming or a foam-forming reaction mixture from at least two flowable components and for the transfer of this reaction mixture into a cavity (such as a mold cavity), the apparatus comprising a mixing head, at the outlet opening of which is connected at an angle a filling tube in which an ejection piston is introduced, the rear neutral position of the leading edge of which is located upstream of the outlet opening of the mixing head.

BACKGROUND OF THE INVENTION

Mixing heads are known, for example, from U.S. Pat. Nos. 3,975,128 and 4,175,874, in which the flow of mixture issuing from a mixing chamber is deflected at a right angle into a relatively short stabilizing channel and then into a molding cavity or the like. An ejection piston is associated with the stabilizing channel, the head and shaft of this piston consisting of a single, equally strong piece which corresponds in diameter to that of the stabilizing channel. The hydraulic piston which is positioned on the rear end of this piston and is bilaterally chargeable is larger in diameter than the piston itself. In this apparatus, the stabilizing channel is located in a tubular housing and serves only to stabilize the reaction mixture issuing turbulently out of the mixing chamber, so that the mixture may enter into the molding cavity in a laminar flow from the stabilizing channel.

For different applications, it is sensible to provide a comparatively long connection piece between the mixing head and the molding cavity, in order to allow the apparatus to be attached more easily to the respective inlet opening of the particular molding cavity, for example, in the case of multi-layer presses. A connection piece of this type is approximately from 0.2 to 2 m long and, preferably, from 0.5 to 1 m long. Hitherto, the operation has been managed by using filling tubes of a corresponding length which then had to be freed from the remnants of the mixture by mechanical means or by using a rinsing agent. Inexpensive tubes have been also used for such purposes and after limited use have been thrown away.

These known apparatuses have the disadvantages of being relatively expensive and require a rinsing agent or expendable tubes. They also cause a considerable amount of reaction mixture to be lost.

Use of the apparatuses with the stabilizing channels from U.S. Pat. Nos. 3,975,128 and 4,175,874 is ruled out when a long connection piece is necessary because the previously known type of ejection piston can only be of a short length. Ejection pistons of longer length become blocked by the film which forms with time on the inside wall of the stabilizing channel. In spite of a good cleaning effect by the ejection piston, this film cannot be completely avoided.

The object of this invention is to provide an apparatus with which mold cavities may be filled without loss of reaction mixture and without involving a substantial working expense or the use of rinsing agents via a relatively long connection piece.

BRIEF DESCRIPTION OF THE DRAWINGS

FIG. 1 illustrates the apparatus according to a first embodiment in longitudinal section;

FIG. 2 illustrates the apparatus according to the section A-B in FIG. 1;

FIG. 3 illustrates the apparatus according to a second embodiment in longitudinal section; and FIG. 4 is a sketch of a belt having preperforated cleaning platelets.

DESCRIPTION OF THE INVENTION

The present invention is directed to an apparatus for the production of a solid-forming or a foam-forming reaction mixture from at least two flowable components and for the transfer of this reaction mixture into a cavity, the apparatus comprising a mixhead at the outlet opening of which is connected at an angle a filling tube in which an ejection piston which is designed as a piston head having a piston rod of a smaller diameter is positioned, the rear neutral position of the piston head being located upstream of the outlet opening of the mixing chamber, characterized in that an introduction slit is provided in the filling tube between the rear neutral position of the ejection piston and the outlet opening of the mixing chamber and a delivery device for cleaning platelets is associated with the introduction slit.

Before the mixing procedure begins, a cleaning platelet which corresponds to the size of the tube channel may be inserted through the introduction slit into the channel of the filling tube, while the ejection piston is in the rear neutral position. The cleaning platelets are preferably even slightly larger than the tube channel in order that they undergo a particularly effective pressing action with the wall of the filling channel and, thus, heighten their cleaning effect. Cardboard or plastics of the necessary elasticity and strength are suitable as a material for the cleaning platelets.

After introduction of the platelet into the channel, the ejection piston of the filling tube is advanced to advance the platelet in the channel to affect a better sealing of the introduction slit by positioning the cleaning platelet directly upstream of the outlet opening of the mixing chamber. The mixing chamber is itself also preferably provided with an ejection piston, as is known, for example, from U.S. Pat. No. 3,975,128. If this was not the case, the mixing chamber would have to be cleaned using a rinsing agent. At the end of the mixing procedure, the ejection piston, which is preferably provided in the mixing chamber, empties the chamber by expelling the mixture. The ejection piston of the filling tube then moves forward, pushing the cleaning platelet in front of it—thus emptying the filling channel in this movement—and finally returns to its rear neutral position.

Using these cleaning platelets, it is possible to have a greater clearance between the piston head and the inside wall of the filling tube than would be possible in previously known apparatuses using ejection pistons for the stabilizing channels. The risk of blockage may, thereby, be very substantially reduced because the piston head is not required to be very large. The piston rod itself does not come into contact at all with the wall of the filling channel, due to its smaller diameter. A difference of from 0.2 to 2 mm between the piston head diameter and the diameter of the filling channel has proven to be suitable.

The platelets may be most easily inserted manually into the filling channel by means of the delivery device. In a particular embodiment of the present invention, the delivery device is provided with a drive, the control for which is coupled with the ejection piston. In this manner, additional operating staff are not required because the cleaning platelets are fed in automatically. The staff concerned with the delivery operation only have to make sure that a corresponding supply of cleaning platelets is always available to the delivery device.

According to one particular embodiment, the delivery device comprises a magazine for stacked cleaning platelets and a slide. In principle, the slide operates similarly to the slides of slide projectors which insert slides into a ray of light. It is obvious that the slide must be sized to coordinate with the size of the cleaning platelets. The uppermost platelet of the pile in each case is pushed into the recess of the slide from the magazine.

According to another particular embodiment, the delivery device comprises a belt guide having a feed drive for a belt. In this arrangement, the cleaning platelets are preferably preperforated in the belt in order that they may be easily punched out of the belt by the piston head of the ejection piston. However, it is also possible to use a belt without preperforations. In this case, the front edge of the piston head must be particularly sharp-edged in order to be able to punch the cleaning platelets out of the belt. In either case, a delivery roller having a roller bearing is preferably provided for the belt.

In an alternative to this continuous belt arrangement, the belt consists of individual strip sections. In this event, a magazine must be provided for the strips.

The use of a belt in the form of a continuous roll or in the form of comparatively long strips allows a greater store of supplies on the apparatus, so that the operating staff have to provide supplies after longer intervals of time.

According to a particular embodiment, the end of the filling tube has a centering attachment and the ejection piston may be sightly moved out of the filling tube. By this measure, the ejection piston can push the cleaning platelet into the filling opening of the molding cavity where an indentation is provided into which the cleaning platelet snaps. Thus, the platelet can form a seal for the molding cavity. It is obvious that the forward neutral position of the ejection piston must be coordinated with the length of the filling tube and with the position of the indentation in the filling opening of the molding tool.

The new apparatus is illlustrated schematically in two embodiments in the drawings and is explained in more detail in the following.

The apparatus in FIGS. 1 and 2 comprises a mixing head 1 having a filling tube 4 positioned perpendicularly to the outlet opening 2 of the mixing chamber 3 and attached to the filling opening 5 of a molding tool 6.

The mixing head 1 comprises a housing 7 in which is provided a hydraulically-movable ejection piston 8. The front face 9 of the piston 8 is adapted to the curvature of the inside wall 10 of the filling tube 4, so that there is no interruption to the inside wall 10 of the filling tube 4 in the cleaning position of the ejection piston 8. Injection openings 11 and 12 are provided in the mixing chamber 3.

An ejection piston 13 is also introduced into the filling tube 4. The piston 13 comprises a piston head 14 and a piston rod 15. The diameter of the rod 15 is smaller than the piston head 14 which is coordinated with the diameter of the channel 16 of the filling tube 4. The piston rod 15 is attached to a bilaterally-chargeable hydraulic piston 17 which, together with a hydraulic chamber 18, forms the hydraulic drive 19 for the ejection piston 13. While the control device of the ejection piston 13 is not illustrated in more detail it is, of course, coordinated with the operation of the mixing head 1.

Between the (illustrated) rear neutral position of the ejection piston 13 and the outlet opening 2 of the mixing chamber 3, the filling tube 4 has an obliquely-positioned introduction slit 20 with which is associated a delivery device 21 for cleaning platelets 22. These cleaning platelets 22 are positioned as plates in a refillable magazine 24 where they are fed by the pressure of a spring 25 and are introduced into a slide 26. This slide 26 may be moved back and forth in a sliding guide 27 positioned in the plane of the introduction slit 20 by an (illustrated) drive 28. Initially, the guide accommodates one cleaning platelet 22 from the pile 23 in its recess 29 which is adapted to the size of a cleaning platelet 22. The drive 28 is then engaged by the limit switch 30 via a pulse transducer 31 which returns the piston 13 into the (illustrated) rear neutral position and displaces the slide 26 such that the cleaning platelet 22 exactly fills the cross-section of the channel 16 and it comes to rest directly between the piston head 14 and the outlet opening 2. The apparatus is now ready for operation.

Upon initiating the mixing procedure, the hydraulic drive 19 is started and the cleaning platelet 22 is advanced to just short of the outlet opening 2, thus sealing the channel 16 and removing the problem of introduction slit 20. The mixing procedure itself then comes into action, having been delayed via a time relay. By this time, the filling tube 4 has already been engaged with its centering attachment 32 in the corresponding centering piece 33 of the filling opening 5 of the molding tool 6. Once the necessary quantity of reaction mixture has been produced and introduced into mixing chamber 3, the ejection piston 8 empties the mixing chamber 3. The hydraulic drive 19 receives a new pulse and the ejection piston 13 is advanced further through the introduction slit 20 of the slide 26 toward its forward neutral position. During this operation, the channel 16 is emptied into filling opening 5. The forward neutral position of the ejection piston 13 is adjusted such that the cleaning platelet 22 snaps into an indentation 34 located in the filling opening 5 and in this advantageous manner, serves as a seal for the filling opening 5.

The apparatus in FIGS. 3 and 4 comprises a mixing head 41 having a filling tube 44 positioned obliquely to the outlet opening 42 of the mixing chamber 43 and attached to the filling opening 45 of a molding tool 46.

The mixing head 41 comprises a housing 47 in which is provided a hydraulically-movable ejection piston 48. The front face 49 of the piston 48 is adapted to the curvature of the inside wall 50 of the filling tube 44, so that there is no interruption to the inside wall 50 of the filling tube 44 in the cleaning position of the ejection piston 48. Injection openings 51 and 52 are provided in the mixing chamber 43.

An ejection piston 53 is also introduced into the filling tube 44. The piston 53 comprises a piston head 54 and a piston rod 55. The diameter of the rod 55 is smaller than the piston head 54 which is coordinated with the diameter of the channel 56 of the filling tube 44. The piston rod 55 is attached to a bilaterally-chargeable hydraulic piston 57 which, together with a hydraulic chamber 58 forms the hydraulic drive 59 for the ejection piston 53. The control device of the ejection piston 53 is not illustrated in more detail but it is, of course, coordinated with the operation of the mixing head.

Between the (illustrated) rear neutral position of the ejection piston 53 and the outlet opening 42 of the mixing chamber 43, the filling tube 44 has an obliquely-positioned introduction slit 60 with which is associated a delivery device 61 for cleaning platelets 62. The cleaning platelets 62 are located in a belt 63, are made of the same material (plastics) as the belt 63 and are delimited by preperforations 64. The preperforations 64 are all at the same distance from each other. The belt 63 is wound on a roller 65 which is located on an unwinding station 66. The belt 63 is introduced into the introduction slit 60 via a sliding guide 67 and is transported by the drive 68. The feed of the belt 63 is adjusted such that one preperforated cleaning platelet 62 always comes to lie precisely in the channel 56. The ejection piston 53 must occupy its rear neutral position before the belt 63 is introduced into the introduction slit 60.

Once the belt 63 has been guided into the introduction slit 60, the hydraulic drive 59 is started. The cleaning platelet 62 (after it has been punched out of its preperforations 64 by the piston head 54) is then advanced to just short of the outlet opening 42 thus sealing the channel 56.

For the subsequent mixing procedures, the feed of the belt 63 is controlled by the limit switch 70 which give commands to the drive 68 via a pulse transducer 71 and which may be actuated by the ejection piston 53. This drive 68 has a wheel 76 provided with transport teeth 75 which engage corresponding perforations 77 in the belt 63.

After the advance feed of the belt 63 and cleaning platelet 62, the mixing procedure begins, having been delayed by a time relay. By this time, the filling tube 44 has already engaged with its centering attachment 72 in the corresponding centering piece 73 of the filling opening 45 of the molding tool 46.

Once the desired quantity of reaction mixture has been produced, the ejection piston 48 empties the mixing chamber 43. The hydraulic drive 59 receives a new pulse and the ejection piston 53 is further advanced toward its forward neutral position through the opening in the belt 63 caused by the expulsion of the cleaning platelet 62. During this operation, the channel 56 is emptied. The forward neutral position of the ejection piston 53 is adjusted such that the cleaning platelet 62 snaps into an indentation 74 located in the filling opening 45 and in this advantageous manner, serves as a seal for the filling opening 45.

Although the invention has been described in detail in the foregoing for the purpose of illustration, it is to be understood that such detail is solely for that purpose and that variations can be made therein by those skilled in the art without departing from the spirit an scope of the invention except as it it may be limited by the claims.

What is claimed is:

1. An apparatus for the production of a solid-forming or a foam-forming reaction mixture from at least two flowable components, the apparatus comprising a mixing head with a mixing chamber having an outlet opening, a filling tube, an ejection piston which is designed as a piston head having a forward and a rear position and a piston rod with a smaller diameter than that of the piston head and an introduction slit for the introduction of cleaning platelets, which platelets correspond to the size and shape of the filling tube and which are advanced through the filling tube by the ejection piston to clean residual mixture from the filling tube, wherein at the outlet opening of the mixing chamber is connected at an angle said filling tube in which the ejection piston is positioned, said introduction slit being provided in the filling tube between the rear position of the ejection piston and the outlet opening of the mixing chamber, and wherein a delivery device for cleaning platelets is associated with the introduction slit.

2. The apparatus of claim 1, characterized in that the delivery device is provided with a drive, the mechanical control for which is coupled with the ejection piston.

3. The apparatus of claim 1 or 2, characterized in that the delivery device comprises a magazine for stacked cleaning platelets and of a slide for positioning the platelets.

4. The apparatus of claim 1 or 2, characterized in that the delivery device comprises a belt guide having an advance drive for a belt.

5. The apparatus of claim 4, characterized in that the cleaning platelets are preperforated in the belt in order that they may be pushed out of the belt.

6. The apparatus of claim 4, characterized in that a delivery roller having a roller bearing is provided for the belt.

7. The apparatus of claim 4, characterized in that the belt comprises individual strip sections.

8. The apparatus of claim 1, characterized in that the end of the filling tube has a centering attachment and that the ejection piston may be slightly moved out of the filling tube.

* * * * *